United States Patent
Delpy et al.

(10) Patent No.: US 12,374,824 B2
(45) Date of Patent: Jul. 29, 2025

(54) ELECTRICAL CONNECTION DEVICE COMPRISING END-FITTINGS PLACED END TO END

(71) Applicant: Airbus Operations SAS, Toulouse (FR)

(72) Inventors: Vincent Delpy, Toulouse (FR); Gérard Millet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 342 days.

(21) Appl. No.: 17/861,625

(22) Filed: Jul. 11, 2022

(65) Prior Publication Data
US 2023/0011060 A1     Jan. 12, 2023

(30) Foreign Application Priority Data
Jul. 12, 2021 (FR) .................................. FR2107570

(51) Int. Cl.
*H01R 13/622* (2006.01)
*H01R 4/72* (2006.01)
*H02G 15/18* (2006.01)

(52) U.S. Cl.
CPC ............. *H01R 13/622* (2013.01); *H01R 4/72* (2013.01); *H02G 15/1806* (2013.01); *H01R 2201/26* (2013.01)

(58) Field of Classification Search
CPC .... H02G 15/1806; H01R 13/622; H01R 4/72; H01R 2201/26
USPC ........................................................ 439/320
See application file for complete search history.

(56) References Cited

U.S. PATENT DOCUMENTS

| | | | |
|---|---|---|---|
| 904,603 A | 11/1908 | Crocker | |
| 1,646,660 A | 10/1927 | Prince | |
| 3,441,898 A | 4/1969 | Nodfelt | |
| 5,435,740 A | 7/1995 | Crededio et al. | |
| 2013/0309903 A1* | 11/2013 | Iio ..................... | H01R 13/5216 439/523 |

FOREIGN PATENT DOCUMENTS

| | | |
|---|---|---|
| DE | 2705798 A1 | 8/1978 |
| GB | 232756 A | 4/1925 |

OTHER PUBLICATIONS

French Search Report; priority document.

* cited by examiner

*Primary Examiner* — Gary F Paumen
(74) *Attorney, Agent, or Firm* — Greer, Burns & Crain, Ltd.

(57) ABSTRACT

An electrical connection device including a first end-fitting secured to a first part of an electrical cable, including a first cylindrical lateral surface coaxial to a first axis and a first end surface forming a first angle with the first axis, a second end-fitting secured to a second part of an electrical cable, including a second cylindrical lateral surface coaxial to a second axis and a second end surface forming a second angle with the second axis equal to the first angle, and a holding system configured to hold the first and second end surfaces pressed against one another. The first and second end-fittings are directly in contact with one another and held in contact via a holding system coaxial to the first and second end-fittings and supported by the latter, which contributes to obtaining a compact device.

9 Claims, 2 Drawing Sheets

ELECTRICAL CONNECTION DEVICE COMPRISING END-FITTINGS PLACED END TO END

CROSS-REFERENCES TO RELATED APPLICATIONS

This application claims the benefit of the French patent application No. 2107570 filed on Jul. 12, 2021, the entire disclosures of which are incorporated herein by way of reference.

BACKGROUND OF THE INVENTION

The present application relates to an electrical connection device comprising end-fittings placed end to end.

According to one embodiment, an aircraft comprises a plurality of bundles of large electrical cables, also referred to as generation routes or power routes, allowing electrical power to be conveyed between the various electrical power sources, such as the engines or the auxiliary power group, for example, and an electrical power management and distribution center, also referred to as a primary power distribution center (PEPDC).

According to one operator mode, with the fuselage of an aircraft being produced by assembling sections end to end, each generation route comprises a plurality of parts, one for each section of the fuselage, connected to one another.

According to one embodiment illustrated in FIG. 1, each electrical cable 10 comprises an upstream part 10.1, a downstream part 10.2 and an electrical connection device 12 connecting the upstream and downstream parts 10.1, 10.2.

Each electrical connection device 12 comprises a support 14, an upstream terminal 14.1, a downstream terminal 14.2 and an electrical connection element 16 connecting the upstream and downstream terminals 14.1, 14.2, the upstream and downstream terminals 14.1, 14.2 and the electrical connection element 16 being secured to the support 14. In addition, each electrical connection device 12 comprises an upstream lug 18.1 crimped to the end of the upstream part 10.1 of the electrical cable 10 and a downstream lug 18.2 crimped to the end of the downstream part 10.2 of the electrical cable 10, the upstream and downstream lugs 18.1, 18.2 being respectively connected to the upstream and downstream terminals 14.1, 14.2 by screws.

The various supports of the electrical connection devices 12 of a bundle of electrical cables are juxtaposed with one another so as to form a strip 20.

This embodiment is relatively bulky. This bulk proves to be problematic in confined, highly concentrated areas, such as the front section of the fuselage, for example.

The present invention aims to overcome all or some of the disadvantages of the prior art.

SUMMARY OF THE INVENTION

To this end, the invention relates to an electrical connection device comprising a first end-fitting secured to a first part of an electrical cable and a second end-fitting secured to a second part of an electrical cable, wherein the first end-fitting comprises a first axis, a first cylindrical lateral surface coaxial to the first axis and a first end surface forming a first angle with the first axis; wherein the second end-fitting comprises a second axis, a second cylindrical lateral surface coaxial to the second axis and a second end surface forming a second angle with the second axis that is equal to the first angle, wherein the electrical connection device comprises a holding system configured to hold the first and second end surfaces pressed against one another and a centering system configured to center the first and second end-fittings with respect to one another comprising a bushing in which are at least partially fitted the first and second end-fittings in a coaxial manner, and wherein the bushing extends between first and second ends and comprises a slot connecting the first and second ends to allow the bushing to expand radially in an elastic manner, the bushing having an inside diameter slightly less than that of the first and second lateral surfaces of the first and second end-fittings.

This arrangement makes it possible to obtain a more compact electrical connection device. The fact of providing a separate holding system and centering system allows them each to be optimized independently of one another. Finally, with the centering system taking the form of a split tube or bushing clamped onto the lateral surfaces of the first and second end-fittings, the whole inner surface of the bushing is in contact with the first and second end-fittings, which contributes to optimizing the centering.

According to another feature, each first or second end surface forms an angle of between 10 and 45° with the first or second axis.

According to another feature, the holding system comprises a first sleeve connected to a first element among the first and second end-fittings and a second sleeve connected to a second element among the first and second end-fittings, which is different from the first element, the first and second sleeves being connected to one another directly or indirectly in a demountable manner According to another feature, each of the first and second sleeves is substantially tubular, has inner and outer surfaces, extends between first and second ends and comprises an inner flange at the first end and a threaded or tapped portion at its outer or inner surface which extends from the second end; the holding system comprising first and second stops respectively secured to the first and second end-fittings against which respectively bear the inner flanges of the first and second end-fittings.

According to one embodiment, the threaded portion of the first sleeve is positioned on its outer surface, the tapped portion of the second sleeve being positioned on its inner surface and configured to be screwed onto the threaded portion of the first sleeve.

According to another feature, the first and second end-fittings respectively comprise first and second arresters which project with respect to the first and second lateral surfaces and are configured to immobilize the bushing between them.

According to another feature, the bushing is made of an electrically conducting material.

According to one embodiment, the bushing has first and second ends and an outer surface comprising first and second threaded portions extending from each of the first and second ends, the tapped portions of the first and second sleeves being positioned on their inner surfaces and configured to be screwed onto the threaded portions of the bushing.

According to another feature, the electrical connection device comprises an electrically insulating sheath covering the first and second end-fittings and the holding and centering systems.

BRIEF DESCRIPTION OF THE DRAWINGS

Other features and advantages will emerge from the description of the invention which follows, the description being given only by way of example and with reference to the appended drawings, in which.

DETAILED DESCRIPTION OF THE PREFERRED EMBODIMENTS

Figure 1:
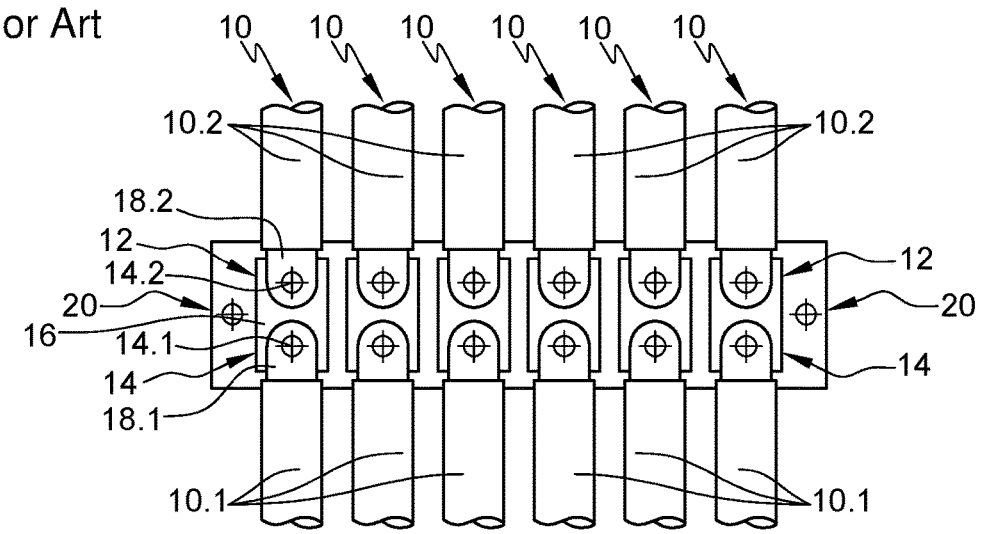
FIG. 1 is a plan view of an electrical connection device illustrating one embodiment of the prior art.
Figure 2:
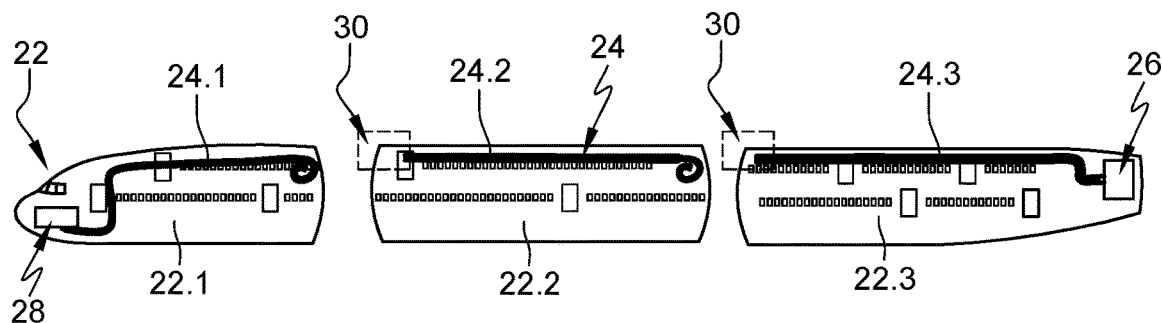
FIG. 2 is a schematic representation of a fuselage of an aircraft before its assembly.

According to one embodiment visible in FIG. 2, an aircraft 22 comprises a fuselage composed of a plurality of sections 22.1, 22.2, 22.3 assembled end to end. The aircraft 22 comprises at least one bundle of electrical cables 24 connecting an electrical generator 26, such as an engine or auxiliary power unit for example, and an electrical load or a PEPDC-type electrical power management and distribution center 28. This bundle of electrical cables 24 is referred to as a generation route.

This bundle of electrical cables 24 comprises a plurality of parts 24.1, 24.2, 24.3, one for each section 22.1, 22.2, 22.3 of the fuselage, connected to one another during the assembly of the sections of the fuselage in junction regions 30.

Each bundle of electrical cables 24 comprises a plurality of electrical cables 32 each having, in each junction region 30, a first part 32.1, a second part 32.2 and an electrical connection device 34 connecting the first and second parts 32.1, 32.2.

Each electrical connection device 34 comprises a first end-fitting 36.1 secured to the first part 32.1 of the electrical cable 32 and a second end-fitting 36.2 secured to the second part 32.2 of the electrical cable 32.

The first end-fitting 36.1 has an approximately cylindrical shape and a first axis A36.1, the first end-fitting 36.1 comprising a first cylindrical lateral surface 38.1 coaxial to the first axis A36.1 and a first end surface 40.1. In parallel, the second end-fitting 36.2 has an approximately cylindrical shape and a second axis A36.2, the second end-fitting 36.2 comprising a second cylindrical lateral surface 38.2 coaxial to the second axis A36.2 and a second end surface 40.2. The first and second lateral surfaces 38.1, 38.2 have identical diameters. The first end surface 40.1 is substantially flat and forms a first angle with the first axis A36.1. In parallel, the second end surface 40.2 is substantially flat and forms a second angle with the second axis A36.2 that is substantially identical to the first angle. In operation, the first and second end surfaces 40.1, 40.2 are pressed against one another and ensure electrical contact between the first and second end-fittings 36.1, 36.2.

Figure 6:
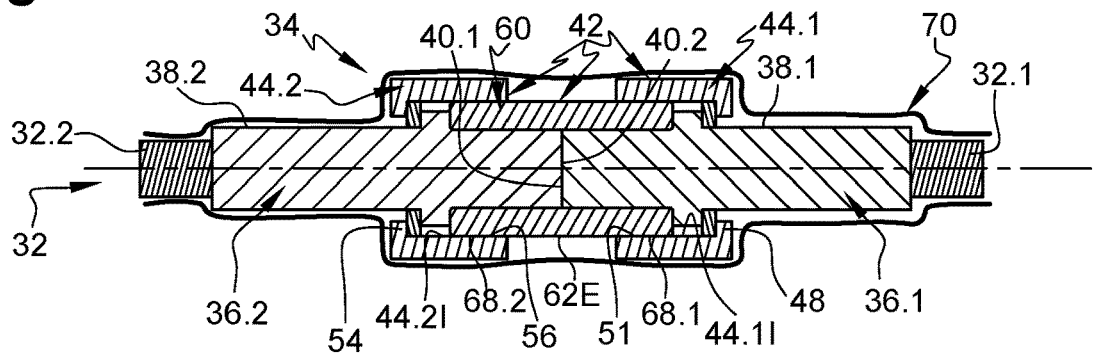
FIG. 6 is a longitudinal section of an electrical connection device illustrating one embodiment of the invention.
Figure 7:
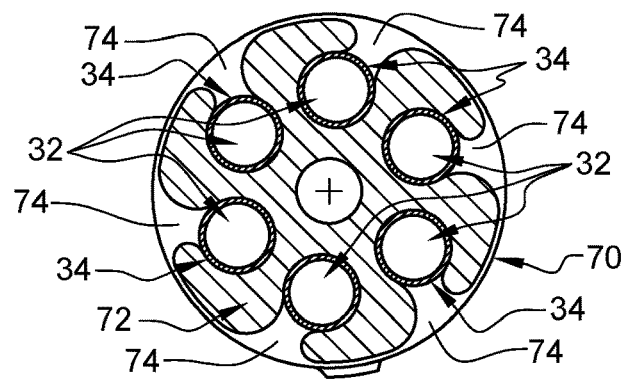
FIG. 7 is a front view of an electrical cable support illustrating one embodiment of the invention.

According to one embodiment visible in FIG. 6, the first and second end surfaces 40.1, 40.2 are perpendicular to the first and second axes A36.1, A36.2.

Figure 3:
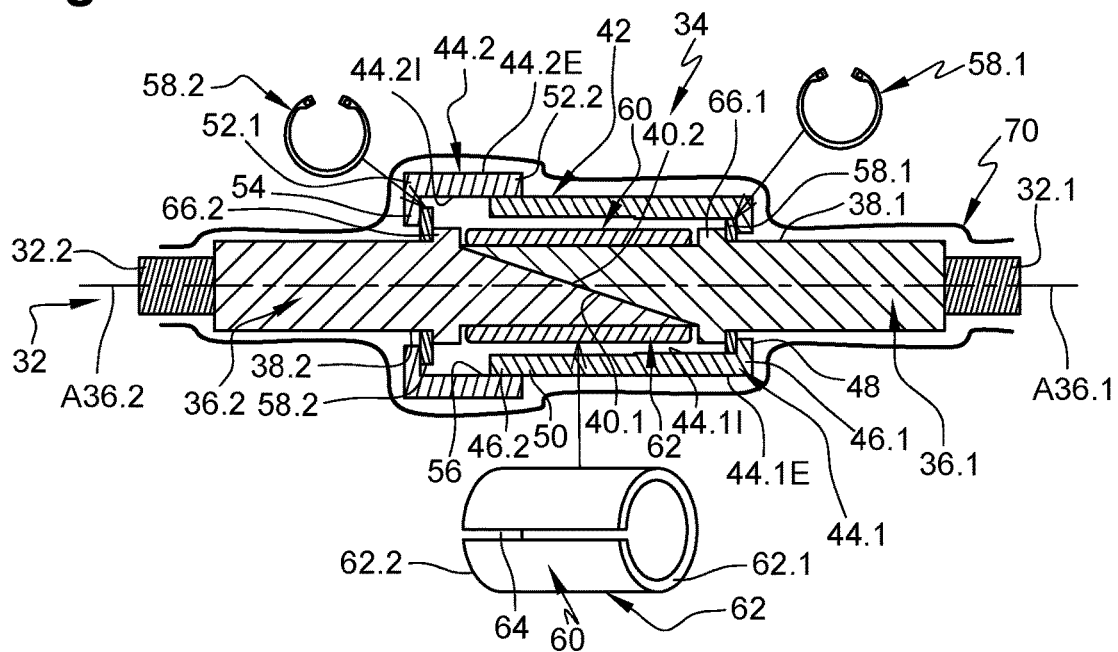
FIG. 3 is a longitudinal section of an electrical connection device illustrating one embodiment of the invention.
Figure 4:
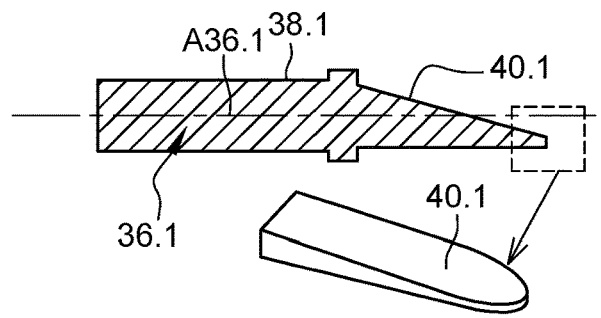
FIG. 4 is a longitudinal section of an end-fitting present at the end of a cable illustrating one embodiment of the invention.
Figure 5:
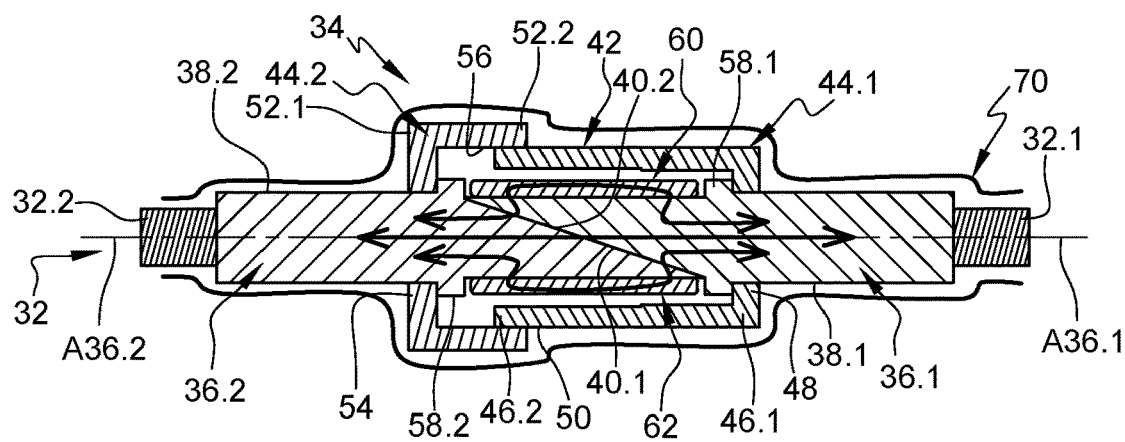
FIG. 5 is a longitudinal section of an electrical connection device illustrating one embodiment of the invention.

According to another embodiment visible in FIGS. 3, 4 and 5, each of the first and second end-fittings 36.1, 36.2 has a beveled shape. Thus, each first or second end surface 40.1, 40.2 forms an angle of between 10 and 45° with the first or second axis A36.1, A36.2. This embodiment makes it possible to increase the surface area of the first and second end surfaces 40.1, 40.2 in contact with one another.

The first and second end-fittings 36.1, 36.2 are metallic and connected to the first and second electrical cables 32.1, 32.2 by crimping, for example.

According to one feature of the invention, the first and second end-fittings 36.1, 36.2 are directly in contact with one another.

According to another feature, the electrical connection device 34 also comprises a holding system 42 configured to hold the first and second end surfaces 40.1, 40.2 of the first and second end-fittings 36.1, 36.2 pressed against one another.

According to one embodiment visible in FIGS. 3 and 5, the holding system 42 comprises a first sleeve 44.1 connected to a first element among the first and second end-fittings 36.1, 36.2 and a second sleeve 44.2 connecting to a second element among the first and second end-fittings 36.1, 36.2, which is different from the first element, the first and second sleeves 44.1, 44.2 being connected to one another directly or indirectly in a demountable manner The first sleeve 44.1 is substantially tubular, has inner 44.1I and outer 44.1E surfaces, extends between first and second ends 46.1, 46.2 and it comprises a first inner flange 48 at the first end 46.1 and a threaded portion 50 at its outer surface 44.1E which extends from the second end 46.2. The outer surface 44.1E of the first sleeve 44.1 also has at least one flat for rotationally immobilizing the first sleeve 44.1 or for making it pivot.

The second sleeve 44.2 is substantially tubular, has inner 44.2I and outer 44.2E surfaces, extends between first and second ends 52.1, 52.2 and comprises a second inner flange 54 at the first end 52.1 and a tapped portion 56 at its inner surface 44.2I which extends from the second end 52.2 and which is configured to be screwed onto the threaded portion 50 of the first sleeve 44.1. The outer surface 44.2E of the second sleeve 44.2 has at least one flat for rotationally immobilizing the second sleeve 44.2 or for making it pivot.

The holding system 44 comprises a first stop 58.1 secured to the first end-fitting 36.1 configured to translationally immobilize the first sleeve 44.1 with respect to the first end-fitting 36.1 in a direction parallel to the first axis A36.1 and in at least one direction in the direction of the first end surface 40.1. In operation, the first inner flange 48 of the first sleeve 44.1 bears against the first stop 58.1 of the first end-fitting 36.1, the latter being positioned between the first inner flange 48 and the first end surface 40.1. According to a first configuration visible in FIG. 3, the first stop 58.1 is separate from the first end-fitting 36.1 and takes the form of a circlip for example. According to a second configuration visible in FIG. 5, the first stop 58.1 and the first end-fitting 36.1 form a single piece, the first stop 58.1 corresponding to a shoulder provided at the first lateral surface 38.1 of the first end-fitting 36.1.

The holding system 42 comprises a second stop 58.2 secured to the second end-fitting 36.2 configured to translationally immobilize the second sleeve 44.2 with respect to the second end-fitting 36.2 in a direction parallel to the second axis A36.2 and in at least one direction in the direction of the second end surface 40.2. In operation, the second inner flange 54 of the second sleeve 44.2 bears against the second stop 58.2 of the second end-fitting 36.2, the latter being positioned between the second inner flange 54 and the second end surface 40.2. According to a first configuration visible in FIG. 3, the second stop 58.2 is separate from the second end-fitting 36.2 and takes the form of a circlip for example. According to a second configuration visible in FIG. 5, the second stop 58.2 and the second end-fitting 36.2 form a single piece, the second stop 58.2 corresponding to a shoulder provided at the second lateral surface 38.2 of the second end-fitting 36.2.

According to one embodiment, the first and second sleeves 44.1, 44.2 are made of an electrically insulating material.

According to another feature, the electrical connection device 34 comprises a centering system 60 configured to center the first and second end-fittings 36.1, 36.2 with respect to one another. This centering system 60 is separate from the holding system 42.

According to one embodiment, the centering system 60 comprises a bushing 62 in which are at least partially fitted the first and second end-fittings 36.1, 36.2 in a coaxial manner According to one configuration, the bushing 62 extends between first and second ends 62.1, 62.2 and comprises a slot 64 connecting the first and second ends 62.1, 62.2 allowing the bushing 62 to expand radially in an elastic manner According to this configuration, the bushing 62 has an inside diameter slightly less than that of the first and second lateral surfaces 38.1, 38.2 of the first and second end-fittings 36.1, 36.2. This second configuration makes it possible to ensure that all of the inner surface of the bushing 62 is in contact with the first and second lateral surfaces 38.1, 38.2 of the first and second end-fittings 36.1, 36.2.

The bushing 62 is made of an electrically conducting material. The fact that all of the inner surface of the bushing 62 is in contact with the first and second end-fittings and that the bushing 62 is made of an electrically conducting material makes it possible to obtain double electrical continuity, as illustrated in FIG. 5 by the double arrows.

According to one embodiment, the first and second end-fittings 36.1, 36.2 respectively comprise first and second arresters 66.1, 66.2 which project with respect to the first and second lateral surfaces 38.1, 38.2, and are configured to immobilize the bushing 62 between them so that, when the end surfaces 40.1, 40.2 are in contact with one another, they are approximately equidistant from the first and second ends 62.1, 62.2 of the bushing 62. For this purpose, the distance separating the first arrester 66.1 and the first end surface 40.1 is equal to that separating the second arrester 66.2 and the second end surface 40.2.

According to one configuration, the first and second stops 58.1, 58.2 perform the functions of the first and second arresters 66.1, 66.2. Thus, the first and second stops 58.1, 58.2 ensure translational immobilization of the first and second sleeves 44.1, 44.2 but also of the bushing 62.

According to one embodiment illustrated in FIG. 6, the bushing 62 is used to hold the first and second end surfaces 40.1, 40.2 pressed against one another.

According to this embodiment, the bushing 62 has an outer surface 62E comprising first and second threaded portions 68.1, 68.2 extending from each of its ends 62.1, 62.2. In addition, the first and second sleeves 44.1, 44.2 are identical and have first and second inner flanges 48, 54 and first and second tapped portions 51, 56 at their inner surfaces 44.11, 44.21 configured to be screwed onto the first and second threaded portions 68.1, 68.2 of the bushing 62.

According to another feature, the electrical connection device 34 comprises an electrically insulating sheath 70 connecting the first and second parts 32.1, 32.2 of the electrical cable 32 by covering the first and second end-fittings 36.1, 36.2 and the holding and centering systems 42, 60.

According to one embodiment, this sheath 70 is a heat-shrinkable sleeve.

Unlike in the prior art, the elements of an electrical connection device 34 are secured to the first and second parts 32.1, 32.2 of the electrical cable 32 and are not attached to a support separate from the electrical cable 32, thereby making it possible to obtain a compact device. Moreover, the first and second end-fittings 36.1, 36.2 are directly in contact with one another and held in contact by means of a holding system 42 coaxial to the first and second end-fittings 36.1, 36.2 and supported by the latter, which contributes to obtaining a compact electrical connection device.

According to one configuration, a bundle of electrical cables 24 comprises at least one support 72 configured to support the various electrical cables 32 in line with a junction region 30. This support 72 comprises a body in the form of a disk with a thickness of the order of 0.5 to 4 centimeters and comprises a notch 74 for each electrical cable 32 opening at the periphery of the support 72. Each notch 74 is dimensioned so as to receive an electrical cable 32 at an electrical connection device 34. Thus, in the case of high-power electrical cables 32, the latter are held spaced apart from one another.

Although described as being applied to high-power electrical cables in an aircraft, the invention is in no way limited to this power range or to aeronautics.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical connection device comprising:
   a first end-fitting secured to a first part of an electrical cable,
   a second end-fitting secured to a second part of an electrical cable,
   wherein the first end-fitting comprises a first axis, a first cylindrical lateral surface coaxial to the first axis and a first end surface forming a first angle with the first axis,
   wherein the second end-fitting comprises a second axis, a second cylindrical lateral surface coaxial to the second axis and a second end surface forming a second angle with the second axis that is equal to the first angle,
   a holding system configured to hold the first and second end surfaces pressed against one another, and
   a centering system configured to center the first and second end-fittings with respect to one another comprising a bushing in which are at least partially fitted the first and second end-fittings in a coaxial manner,
   wherein the bushing extends between first and second ends and comprises a slot connecting the first and second ends to allow the bushing to expand radially in an elastic manner, the bushing having an inside diameter slightly less than that of the first and second lateral surfaces of the first and second end-fittings, and wherein the bushing has first and second ends and an outer surface comprising first and second threaded portions extending from each of the first and second ends, the holding system comprising first and second sleeves, each having inner and outer surfaces extending between first and second ends, and a threaded or tapped portion at an inner surface which extends from the first or second end, the threaded or tapped portions of the first and second sleeves configured to be screwed onto the threaded portions of the bushing.

2. The electrical connection device as claimed in claim 1, wherein each first or second end surface forms an angle of between 1° and 45° with the first or second axis.

3. The electrical connection device as claimed in claim 1, wherein the first sleeve is connected to a first element among the first and second end-fittings and the second sleeve is connected to a second element among the first and second end-fittings, which is different from the first element, the first and second sleeves being connected to one another directly or indirectly in a demountable manner.

4. The electrical connection device as claimed in claim 3, wherein each of the first and second sleeves is substantially tubular and comprises an inner flange at the first end, and the threaded or tapped portion extends from the second end, and
wherein the holding system comprises first and second stops respectively secured to the first and second end-fittings against which respectively bear the inner flanges of the first and second end-fittings.

5. The electrical connection device as claimed in claim 1, wherein the first and second end-fittings respectively comprise first and second arresters, which project with respect to the first and second lateral surfaces and are configured to immobilize the bushing between them.

6. The electrical connection device as claimed in claim 1, wherein the bushing is made of an electrically conducting material.

7. The electrical connection device as claimed in claim 1, wherein the electrical connection device comprises an electrically insulating sheath covering the first and second end-fittings and the holding and centering systems.

8. The electrical connection device as claimed in claim 1, wherein the first cylindrical lateral surface is centered about the first axis, and the second cylindrical lateral surface is centered about the second axis and a second end.

9. An electrical connection device comprising:
a first end-fitting secured to a first part of an electrical cable,
a second end-fitting secured to a second part of an electrical cable,
wherein the first end-fitting comprises a first axis, a first cylindrical lateral surface coaxial to the first axis and a first end surface forming a first angle with the first axis,
wherein the second end-fitting comprises a second axis, a second cylindrical lateral surface coaxial to the second axis and a second end surface forming a second angle with the second axis that is equal to the first angle,
a holding system configured to hold the first and second end surfaces pressed against one another, and
a centering system configured to center the first and second end-fittings with respect to one another comprising a bushing in which are at least partially fitted the first and second end-fittings in a coaxial manner,
wherein the bushing extends between first and second ends and comprises a slot connecting the first and second ends to allow the bushing to expand radially in an elastic manner, the bushing having an inside diameter slightly less than that of the first and second lateral surfaces of the first and second end-fittings,
wherein the holding system comprises a first sleeve connected to a first element among the first and second end-fittings and a second sleeve connected to a second element among the first and second end-fittings, which is different from the first element, the first and second sleeves being connected to one another directly or indirectly in a demountable manner,
wherein each of the first and second sleeves is substantially tubular, has inner and outer surfaces, extending between first and second ends and comprises an inner flange at the first end, and a threaded or tapped portion at its outer or inner surface which extends from the second end,
wherein the holding system comprises first and second stops respectively secured to the first and second end-fittings against which respectively bear the inner flanges of the first and second end-fittings, and
wherein the bushing has first and second ends and an outer surface comprising first and second threaded portions extending from each of the first and second ends, the tapped portions of the first and second sleeves being positioned on their inner surfaces and configured to be screwed onto the threaded portions of the bushing.

* * * * *